United States Patent
Hannessen

(10) Patent No.: US 6,321,899 B1
(45) Date of Patent: Nov. 27, 2001

(54) DEVICE FOR TRANSFERRING GOODS

(75) Inventor: Pieter Gerrit Hannessen, Harderwijk (NL)

(73) Assignee: Nedpack (NL)

( * ) Notice: Subject to any disclaimer, the term of this patent is extended or adjusted under 35 U.S.C. 154(b) by 0 days.

(21) Appl. No.: 09/432,708

(22) Filed: Nov. 2, 1999

(30) Foreign Application Priority Data

Nov. 3, 1998 (NL) .................................................. 1010466

(51) Int. Cl.[7] .................................................. B65G 29/00
(52) U.S. Cl. ........................................ 198/475.1; 198/800
(58) Field of Search .............................. 198/800, 475.1, 198/799, 845, 838

(56) References Cited

U.S. PATENT DOCUMENTS 4,465,177 * 8/1984 Dorner .................................. 198/482
4,987,992 * 1/1991 Pfleger ................................ 198/475.1
5,101,963 * 4/1992 Skarlupka et al. ................... 198/800

FOREIGN PATENT DOCUMENTS 2300112   7/1974   (DE) .

* cited by examiner

Primary Examiner—Kenneth W. Noland
(74) Attorney, Agent, or Firm—Webb Ziesenheim Logsdon Orkin & Hanson, P.C.

(57) ABSTRACT

An apparatus for transferring goods from one conveyor of random nature to another, includes a frame, an endless transporter supported therein and at least one carrier connected thereon. The carrier is connected to the endless transporter for rotation on a lying shaft and a holder is provided for holding the carrier horizontal, so that goods can be transferred in a random path from one conveyor to the other.

6 Claims, 4 Drawing Sheets

DEVICE FOR TRANSFERRING GOODS

BACKGROUND OF THE INVENTION

The present invention relates to a device for transferring goods from one conveyor of random nature to another, comprising a frame, endless transporting means supported therein and at least one carrier connected thereto.

Such device are applied in transport systems wherein vertical and/or horizontal distances between different conveyors have to be bridged, or simply in order to save space.

A first device known from the prior art comprises flexible mats which are connected to four endless transporting members such that these mats remain horizontal while supporting goods. Depending on the infeed and outfeed direction of the goods, the active part of the transporting members is arranged in a C-, L- or Z-shaped configuration in the frame. The goods are taken over from the conveyor close to the underside of the device connecting onto a conveyor. Close to the top side the goods are transferred from the flexible mats onto another conveyor. A drawback of such a device is that at the transition from conveyor to mat and vice versa there lies an opening through which small products can fall between conveyor and device. In addition, this device is of relatively complex structure.

Another device known from the prior art has obviated the drawback of transitions in that it lifts the goods from the conveyor. This is done with carriers formed by fingers arranged parallel to and at a distance from each other which are fed through between the rollers respectively ropes of a roller respectively rope conveyor. Such a device can only be applied in combination with a roller and/or rope conveyor. In addition, the goods can only be transferred in vertical direction because the carriers are fixedly arranged on the endless transporting means.

An object of the present invention is to provide a device for transferring goods from one conveyor of random nature to another, wherein the above stated drawbacks are obviated. Another object of the present invention is to provide such a device wherein the goods can be supplied and discharged from different directions. A final objective of the present invention is to provide such a device which is relatively simple to construct and takes up little space.

SUMMARY OF THE INVENTION

For this purpose the device according to the present invention is characterized in that the carrier is connected to the endless transporting means for rotation on a lying shaft and in that means are provided for holding the carrier horizontal. Goods can hereby be transferred in a random path from the one to the other conveyor.

The means for holding the carrier horizontal preferably comprise at least one guide member which is connected to the carrier and which is in contact with at least one guide track at a distance from the rotation shaft of the carrier. A very simple and inexpensive embodiment of the means for holding the carrier horizontal is hereby obtained.

In order to prevent misalignment of the guide means, the guide member is in contact with the guide track in at least two mutually spaced apart positions parallel thereto.

The means for holding the carrier horizontal preferably further comprise a guide displaceable parallel to itself and a guide member which is connected to the carrier and which is in contact with the guide in at least two mutually spaced apart positions parallel thereto. This guide construction is particularly suitable for use in bends of the endless transporting means. When entering the bend, the guide member comes into contact with the guide, whereby the carrier is held horizontal while the endless transporting means change direction.

In preference the guide is hingedly connected to the frame by means of a parallelogram construction. The guide is hereby displaced parallel to itself. If the guide member exerts an asymmetric pressure on the guide because the carrier is or instance loaded asymmetrically by the product arranged thereon, this cannot result in misalignment of the guide.

In a preferred embodiment of the device according to the present invention horizontal and vertical guide track segments are arranged along the endless transporting means, wherein the guide is arranged in each case close to a transition of the track segments. A random transport path can be formed in simple manner, wherein only straight guide tracks and guides arranged close to the transitions thereof are used.

If the conveyor is formed by a roller conveyor or rope conveyor, the carrier is formed by fingers arranged parallel to and at a distance from each other. The carriers "intersect" the infeed and outfeed paths, whereby during an ascending movement the goods are lifted off the feed conveyor and during a descending movement they are taken off the carrier and placed on the outfeed conveyor. The advantage hereof is that no transport transitions are present and that the device can be constructed very compactly in combination with the conveyors.

BRIEF DESCRIPTION OF THE DRAWINGS

The present invention will be further elucidated with reference to the annexed drawings.

In the drawings.

DETAILED DESCRIPTION OF THE PREFERRED EMBODIMENT

Figure 1:
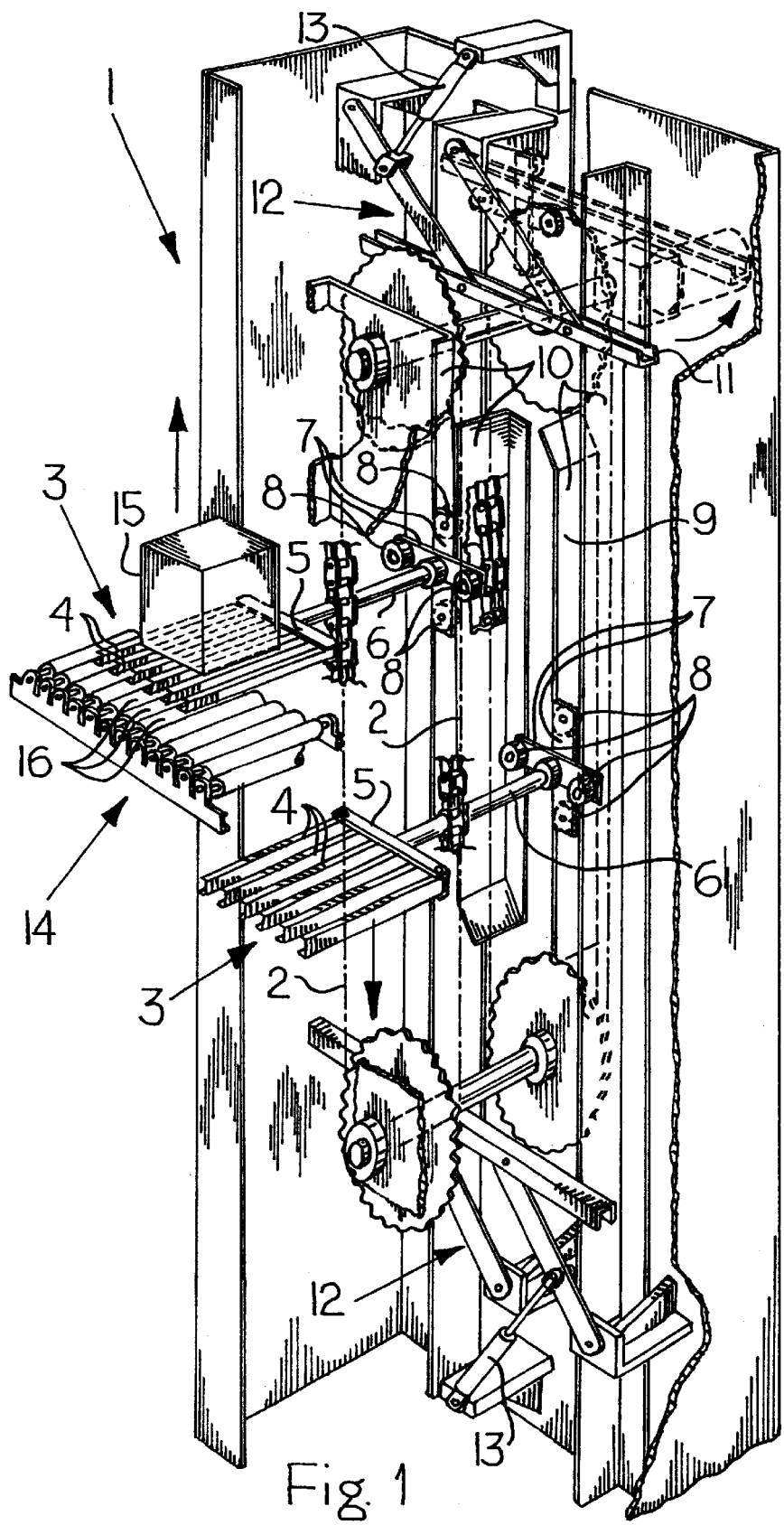
FIG. 1 shows a perspective, partly broken-away view of a device for transferring goods from one conveyor of random nature to another.

A device for transferring goods from one conveyor of random nature to another as shown in FIG. 1 comprises a frame 1, endless transporting means 2 supported therein and having carriers 3 connected thereto. In the embodiment of FIG. 1 the endless transporting means 2 are formed by two chains which run mutually parallel and which in FIG. 1 are partly drawn and partly shown schematically with a centre line. Carrier 3 is formed in this embodiment by parallel fingers 4 arranged at a mutual distance. Fingers 4 are fixed at one end in a U-shaped cross beam 5 which is fixed in turn to a rod 6. Rod 6 is mounted rotatably in chains 2. Carrier 3 is hereby rotatable on a lying axis located in one line with the axis of rod 6. Between the two chains 2 two strips 7 are fixedly connected to rod 6. A guide wheel 8 is arranged on each end of strip 7. Strip 7 with two guide wheels 8 together form a guide member which is connected to carrier 3 and which is in contact at a distance from the rotation shaft of the carrier with a guide track 9 or a guide 11. The guide wheels 8 arranged on the upper and lower side at a distance from the rotation shaft of carrier 3 co-act with a guide track 9. These guide wheels 8 form two points of contact of the guide member with guide track 9 and are located at a mutual distance parallel to guide track 9. Guide track 9 is formed by two plate strips 10 arranged vertically in frame 1. The distance between plate strips 10 is adapted to the diameter of guide wheels 8.

A guide 11 is arranged close to the top of the device. This guide 11 is connected hingedly to frame 1 by means of a parallelogram construction 12. A gas spring 13 is further arranged between parallelogram construction 12 and frame 1. A similar guide 11 with parallelogram construction 12 and gas spring 13 is also provided on the underside of the device. This guide 11 merely operates in reverse direction relative to the guide 11 arranged on the top side.

The operating principle of the device is as follows. Goods 15 are supplied over a roller conveyor 14. Carriers 3 "intersect" the feed path of roller conveyor 14, whereby product 15 is lifted from roller conveyor 14 during the upward movement in that fingers 4 are carried through between the rollers 16 of roller conveyor 14. Carrier 3 is held horizontal by means of guide wheels a which are arranged on the upper and lower side at a distance from the rotation shaft 6 of carrier 3 and which co-act With the vertical guide track 9. Because guide wheels 8 are enclosed at the sides by plate strips 10 it is not possible for carrier 3 to rotate horizontally. As carrier 3 with product 15 placed thereon approaches the top side of the device, the guide wheels 8 arranged on the upper and lower side of carrier 3 leave guide track 9, at which moment the guide wheels 8 arranged on either side of carrier 3 will run up against guide 11. These guide wheels 8 form two points of contact of the guide member with guide 11 and are located at a mutual distance parallel to the guide 11. Guide 11 is urged by means of gas spring 13 to an extreme position, wherein the force with which this takes place is small such that the movement of guide wheels 8 arranged on either side of carrier 3 is not prevented but is large such that guide wheels 8 cannot lose the contact with horizontal guide 11 if an eccentrically placed product 15 tilts carrier 3. In addition, parallelogram construction 12 ensures that guide 11 makes a rotation movement in horizontal position (indicated with an arrow in FIG. 1) and cannot tilt. At the end of the bend the guide wheels 8 arranged on the upper and lower side of carrier 3 will once again be received in a guide track 9 as soon as horizontal guide 11 is on the point of losing contact with guide wheels 8 arranged on either side of carrier 3. When carrier 3 once again "intersects" a discharge path of carrier 3 formed by a roller or rope conveyor (not shown), the product 15 is placed onto this conveyor during the downward movement of carrier 3.

Figure 2:
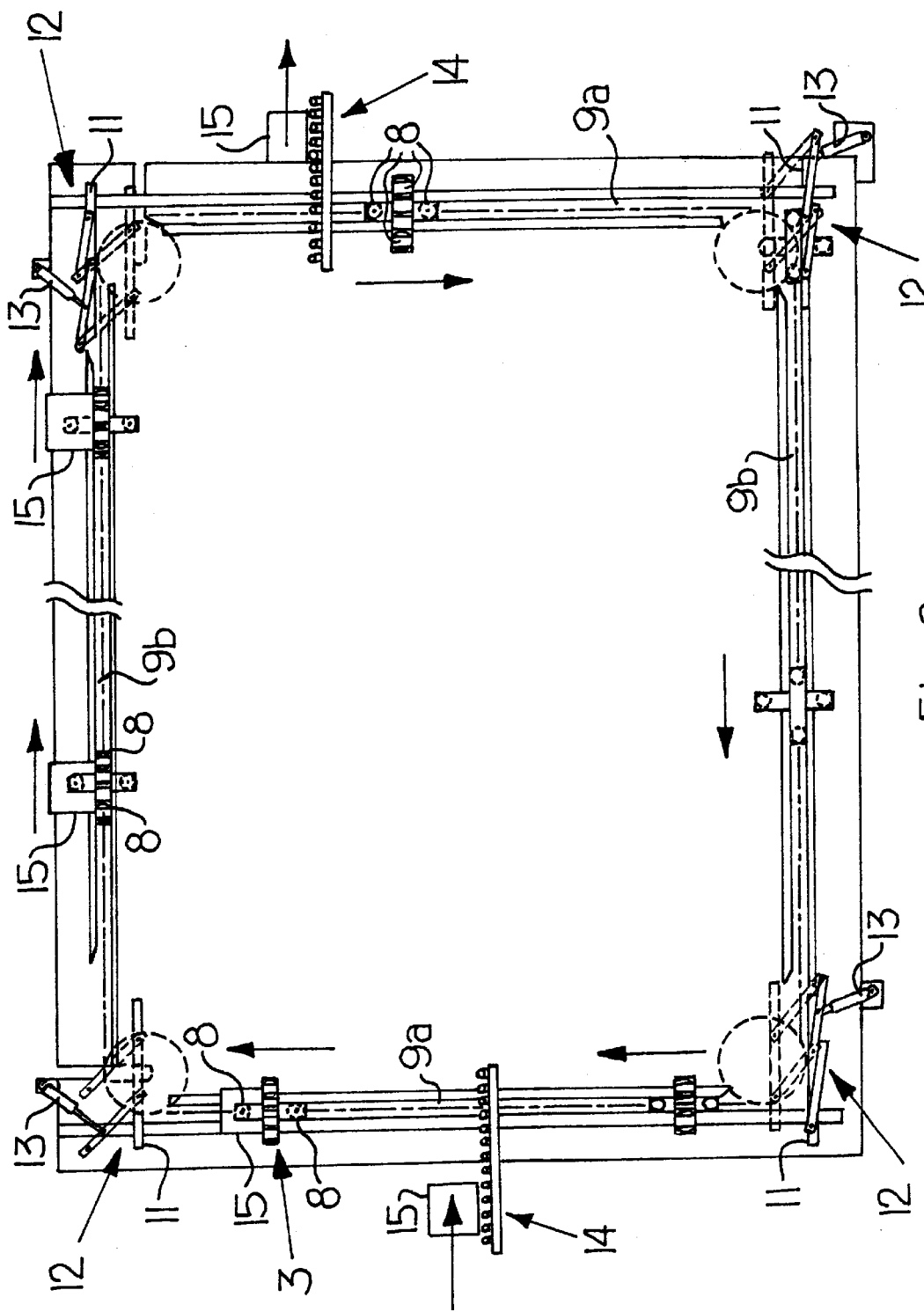
FIG. 2 shows a schematic front view of another embodiment of the device according to the present invention.

FIG. 2 shows schematically a front view of another embodiment of the device according to the present invention. Along the endless transporting means 2 are arranged horizontal 9a and vertical 9b guide track segments, wherein guide 11 is arranged in each case close to a transition of track segments 9a, 9b. The operating principle is substantially the same as that of the embodiment shown in FIG. 1. A difference is that in a horizontal transporting direction the guide wheels 8 arranged on either side of carrier 3 are used to hold carrier 3 horizontal. This is not however essential. It is also possible to use two horizontal guide tracks 9b arranged one above the other, with which the guide wheels 8 arranged on the upper and lower side of carrier 3 co-act. The reverse is also possible for the transport in vertical direction. Instead of guide wheels 8 arranged on the upper and lower side the guide wheels 8 arranged on either side can be guided in two vertical guide track segments 9a arranged mutually adjacently. In these cases the guide member is not however in contact with the guide track at two mutually spaced apart positions parallel thereto, so that misalignment can occur. In addition, it is possible to use curved guide tracks instead of guide 11 close to the transition of track segments 9a, 9b, with which the guide wheels 8 arranged on the upper and lower side and/or on either side of carrier 3 co-act.

Figure 3:
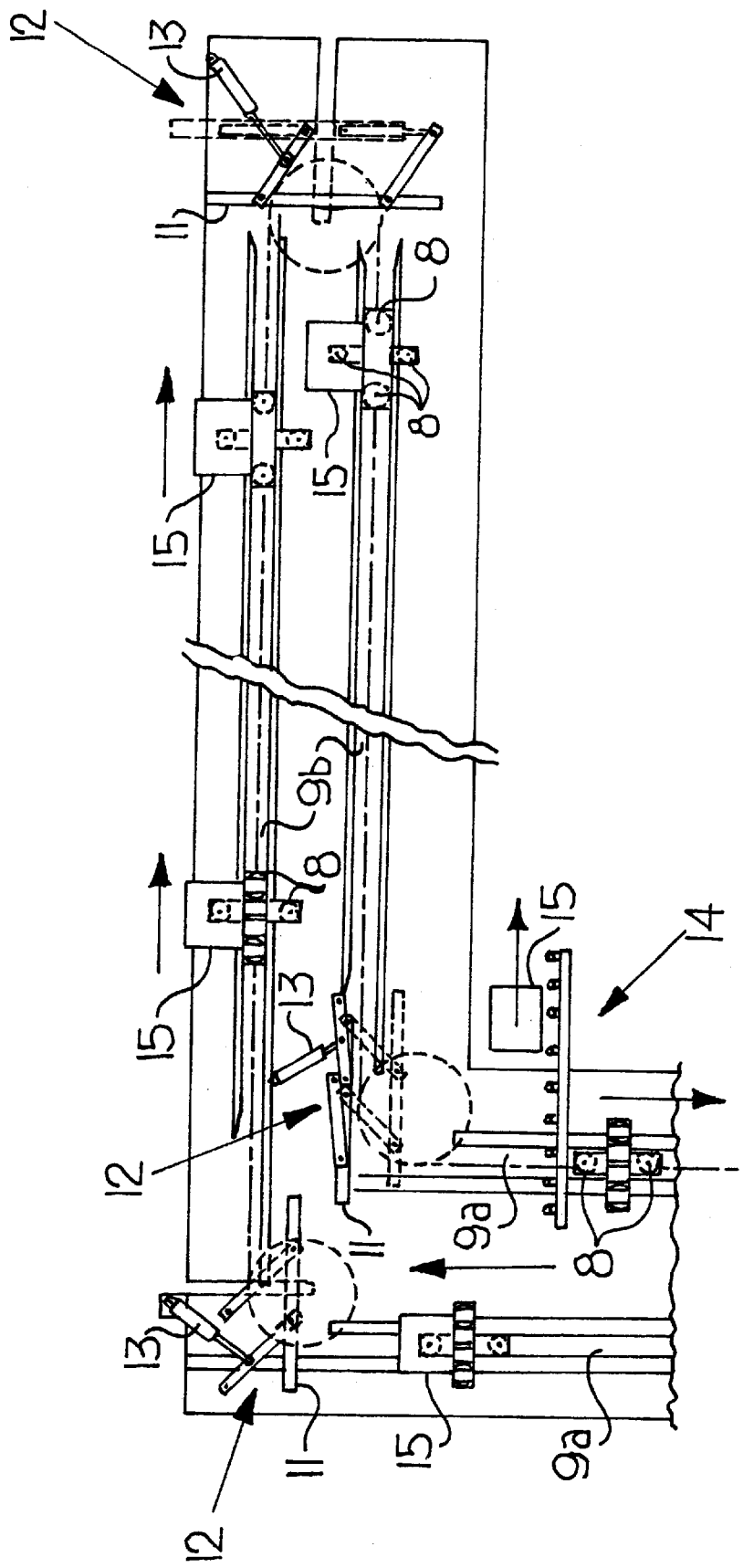
FIG. 3 shows a schematic front view of yet another embodiment of the device according to the present invention.

FIG. 3 shows yet another embodiment of the device according to the present invention. This device is constructed in the same manner as the device of FIG. 2, so that like components are designated with like reference numerals. In this device it is possible to transport goods 15 horizontally without this taking up much space. Close to the transition from the one horizontal track segment 9b to the other horizontal track segment 9b the guide 11 is disposed vertically for co-action with guide wheels 8 arranged on the upper and lower side of carrier 3. It is also possible instead to use two horizontal guides 11 on both the top and bottom of the transition or only one horizontal guide 11 on the top or bottom of the transition which can then make a larger stroke. In these two latter cases the horizontal guide 11 co-acts with guide wheels a arranged on either side of carrier 3.

Using gas spring 13 a product 15 placed eccentrically on carrier 3 is prevented from exerting a moment of any influence whereby guide wheels 8 are tilted and lose contact with guide 11. Other means for exerting a pressure on guide 11, such as a compression spring, can be used instead of a gas spring 13, or guide 11 can be given a heavy form such that product 15 cannot exert any influence on the position of carrier 3.

Figure 4:
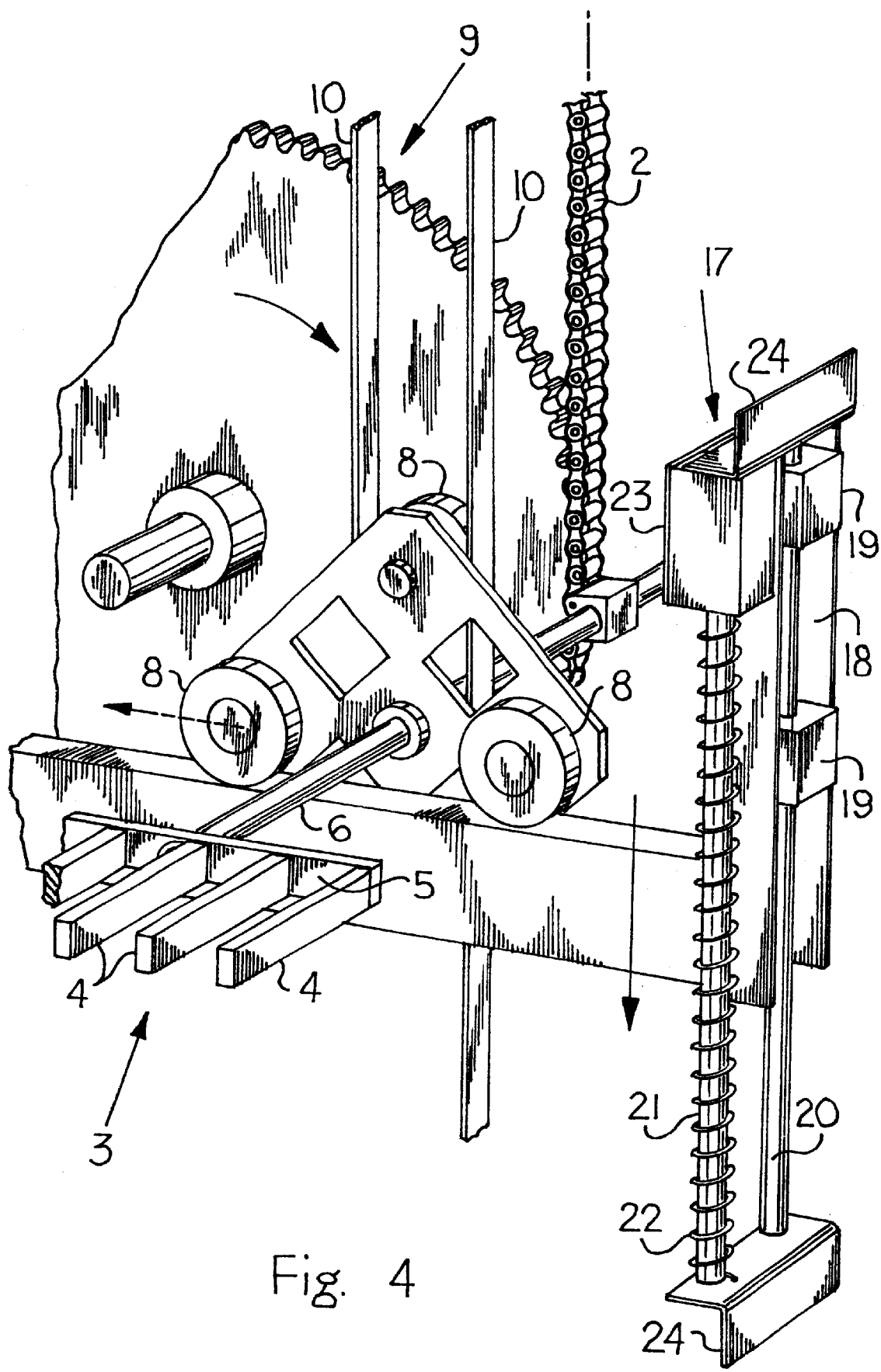
FIG. 4 is a perspective detail view of yet another embodiment of the device according to the present invention.

Finally, FIG. 4 shows yet another embodiment of the device according to the present invention. The perspective view of FIG. 4 is from the bottom right-hand side of the device. Like components are once again designated with like reference numerals. The difference from the embodiment shown in FIG. 1–3 is that guide 11 is connected to frame 1 by means of a linear guide construction 17. A U-shaped profile 18 is fixed to the end surface of guide 11. Two guide blocks or slide bearings 19 are mounted in U-shaped profile 18 at some mutual distance. These guide blocks 19 are guided over a first guide rod 20. A second guide rod 21 is placed parallel to the first guide rod. Arranged over second guide rod 21 is a compression spring 22 which supports at the top against a slide block 23. This latter is likewise fixed to U-shaped profile 18. Guide rods 20,21 are mounted on either side of frame 1 of the device by means of mounting profiles 24. An upward directed force is exerted on guide 11 by compression spring 22. The whole assembly of U-shaped profile 18, guide blocks 19, guide rods 20,21, compression spring 22, slide block 23 and mounting profiles 24 is also provided on the left-hand side (not shown in FIG. 4) of guide 11. When guide wheels 8 arranged on the upper and lower side of carrier 3 leave the vertical guide track 9 (formed by strips 10), the guide wheels a arranged on either side of carrier 3 come into contact with guide 11. Because carrier 3, and therewith guide wheels 8, are driven by chain 2, guide wheels 8 exert on guide 11 a force which in the first instance is directed downward. This force is greater than the upward directed force of compression springs 22, so that guide 11 is guided downward over guide rods 20. When carrier 3, and therewith guide wheels 8, are then driven further by chain 2, guide wheels 8 can roll over guide 11. The combined effect of the downward directed force of chain 2 on guide wheels 8 and the upward directed force of compression springs 22 on guide 11 prevents carrier 3 from tilting. It is noted that a similar linear guide construction 17 can be provided on the top side of the device.

Shown in the embodiments of FIG. 1–4 is a carrier 3 formed by fingers 4 parallel to and at a distance from each other, although this is not essential for the application of the inventive concept. A system wherein goods 15 are transported off the conveyor onto carrier 3, and vice versa, or are transferred in other manner, for instance by means of a pusher, is likewise possible.

What is claimed is:

1. A device for transferring goods from one conveyor of random nature to another, said device comprising a frame, an endless transporting means supported therein and at least one carrier connected thereto, wherein the carrier is connected to the endless transporting means for rotation on a lying shaft and wherein holding means are provided for holding the carrier horizontal;

wherein said holding means includes at least one guide member which is connected to the carrier and which is in contact with at least one guide track at a distance from the rotation shaft of the carrier; and wherein the guide member is in contact with the guide track in at least two mutually spaced apart positions parallel thereto.

2. The device as claimed in claim 1, wherein said holding means includes a guide displaceable parallel to itself and a guide member which is connected to the carrier and which is in contact with the guide in at least two mutually spaced apart positions parallel thereto.

3. The device as claimed in claim 2, wherein the guide is hingedly connected to the frame by means of a parallelogram construction.

4. The device as claimed in claim 2, wherein the guide is connected to the frame by means of a linear guide construction.

5. The device as claimed in claim 2, wherein horizontal and vertical guide track segments are arranged along the endless transporting means, and wherein the guide is arranged in each case close to a transition of the track segments.

6. The device as claimed in claim 1, wherein the conveyor is formed by a roller conveyor or rope conveyor, and wherein the carrier is formed by fingers arranged parallel to and at a distance from each other.

* * * * *

UNITED STATES PATENT AND TRADEMARK OFFICE
CERTIFICATE OF CORRECTION

PATENT NO.     : 6,321,899 B1
DATED          : November 27, 2001
INVENTOR(S)    : Pieter Gerrit Hannessen It is certified that error appears in the above-identified patent and that said Letters Patent is hereby corrected as shown below:

Column 2,
Line 9, "or instance" should read -- for instance --.

Column 3,
Line 23, "guide wheels a" should read -- guide wheels 8 --.

Column 4,
Lines 25 and 58, "guide wheels a" should read -- guide wheels 8 --.

Signed and Sealed this

Twenty-eighth Day of May, 2002

Attest:

JAMES E. ROGAN
*Attesting Officer*   *Director of the United States Patent and Trademark Office*